Patented Dec. 22, 1953

2,663,639

UNITED STATES PATENT OFFICE 2,663,639

PRINTING PLATE PREPARATION

William H. Wood, Mantua, and Dolor N. Adams, Lakewood, Ohio, assignors to Harris-Seybold Company, Cleveland, Ohio, a corporation of Delaware No Drawing. Application January 28, 1950,
Serial No. 141,154

3 Claims. (Cl. 95—7)

Albumen has certain advantages for surfacing printing plates, but it also has certain disadvantages as heretofore known, and has been rather erratic in its operation due to variations in quality of available supplies. The requirements in a successful light sensitive coating for lithographic plates and the like are particularly that the material in solution form should be homogeneous and should be of a viscosity and solids content permitting easy application to the plate and solidification to a layer of proper thickness; and then, after exposing and developing, the light hardened portions should have good adhesion to the plate, toughness, and resistance to water and other chemicals used in printing. Albumen as heretofore known has been especially open to improvement as regards stability, homogeneity, adhesion, toughness and resistance to water and other chemicals. In accordance with the present invention an albumen base material may be had which has great stability in solution, has superior homogeneity, and in a coating is particularly tough and adherent and chemically-resistant and dependable as to dot maintenance. Other objects and advantages of the invention will be apparent from the following description.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

Albumen of usual or desired source such as flake egg albumen, blood albumen, etc., is, in accordance with the invention, modified by an incorporation, in solution, of ethanedial,

CHO—CHO

The albumen is dissolved in water to a convenient concentration, for instance 10 per cent, although a higher or lower percentage may be employed, as for instance 6–18 per cent or up to the maximum albumen-solubility, the criterion being merely a suitable concentration for best working. Then, there is incorporated ethanedial. This is commercially available in the form of a solution of about 30.3 per cent by weight, and pH about 1.3–1.4. About 5% of actual ethanedial or glyoxal as it is also called is desirable, based on the weight of dry albumen, or a range of 2½–5.1 per cent. Or in general, satisfactory results are obtained with a ratio at the rate of 1.0 ml. of such dilute aforesaid commercial solution to each 7.5 grams of albumen. The ratio may in some instances however extend between 0.5 to 1.0 ml. per each 7.5 grams of albumen. The pH of the albumen solution should be adjusted to about 9.0 with concentrated ammonium hydroxide or ammonia gas prior to and during admixing of the ethanedial for best results. An antiseptic or preservative may be added if the solution is not to be used promptly. Pyridyl mercuric acetate is an example of a satisfactory agent of this character and others are phenol, methyl-parahydroxy benzoate, sodium benzoate, pentachlorophenol, etc. The solution is finally completed by the addition of a light-sensitizing agent. This may be for instance ammonium dichromate, and the amount may be in accordance with usual practice, for example, 2.5 grams per each 7.5 grams of albumen, dry basis. Certain diazonium salts may similarly be used. In some cases the light-sensitizer may be applied after coating.

The solution is then coated on a surface which is destined for printing or to be etched, and a plate, for instance a plate of zinc or other desired material is coated as in usual manner.

As an example: Flake albumen 430 grams, pure water 3.15 liters, ethanedial (commercial solution) 57.5 ml., ammonium dichromate 143.3 grams, and pyridyl mercuric acetate 0.645 gram, ammonium hydroxide being used to adjust the pH to 9.0. The plates are coated with this solution, using any desired equipment therefor.

Albumen treated as herein provided is advantageous for lithographic plates, and as cold top surface coating, and as a protection during etching of printing plates or other surfaces to be etched.

The water employed for the solution should be pure, that is distilled, or treated by ion exchange agent, and it is desirable that the pH of the final solution for application to the plates be about 9.0, although a range of 8.0–10.0 is in general operative.

Other modes of applying the principle of the invention may be employed, change being made as regards the details described, provided the features stated in any of the following claims, or the equivalent of such, be employed.

We therefore particularly point out and distinctly claim as our invention:

1. A new composition of matter for light sensitive coating of lithographic printing plates, said composition comprising a 6 to 18% water solution of albumen, a dichromate light sensitizing agent, ethanedial in the proportion of about 2.5 to 5.1% ethanedial to the albumen based on the dry weight of the albumen, and sufficient alkali to adjust the pH to about 9.0.

2. A new composition of matter for light sensitive coating of lithographic printing plates, said composition comprising a 6 to 18% water solution of albumen, a dichromate light sensitizing agent, ethanedial in the proportion of about 2.5 to 5.1% ethanedial to the albumen based on the dry weight of the albumen, sufficient alkali to adjust the pH to about 9.0, and pyridyl mercuric acetate as a preservative.

3. A new composition of matter for light sensitive coating of lithographic printing plates, said composition comprising a 6 to 18% water solution of albumen, a dichromate light sensitizing agent, ethanedial in the proportion of about 2.5 to 5.1% ethanedial to the albumen based on the dry weight of the albumen, sufficient alkali to adjust the pH to about 9.0, and an antispectic preservative.

WILLIAM H. WOOD.
DOLOR N. ADAMS.

References Cited in the file of this patent

UNITED STATES PATENTS

| Number | Name | Date |
| --- | --- | --- |
| 133,701 | Edwards | Dec. 10, 1872 |
| 1,453,259 | John | Apr. 24, 1923 |
| 1,763,533 | Miller | June 10, 1930 |
| 1,870,354 | Brunken | Aug. 9, 1932 |
| 1,941,852 | Brunken | Jan. 2, 1934 |
| 2,180,335 | Brunken | Nov. 21, 1939 |
| 2,229,052 | Dell | Jan. 21, 1941 |

FOREIGN PATENTS

| Number | Country | Date |
| --- | --- | --- |
| 6,690 | Great Britain | 1894 |
| 4,043 of 1912 | Great Britain | Feb. 17, 1913 |

OTHER REFERENCES

The National Lithographer, vol. 48, Oct. 1941, pg. 26.